US011902105B2

United States Patent
Zapata et al.

(10) Patent No.: US 11,902,105 B2
(45) Date of Patent: Feb. 13, 2024

(54) INTERACTIVE GRAPHICAL USER INTERFACE FOR VISUALIZING FLOW DATA IN A PROGRAMMABLE NETWORK SWITCH

(71) Applicant: RED HAT, INC., Raleigh, NC (US)

(72) Inventors: Adrian Moreno Zapata, Madrid (ES); Marcelo Leitner, Sao Paulo (BR)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/751,780

(22) Filed: May 24, 2022

(65) Prior Publication Data

US 2023/0388198 A1    Nov. 30, 2023

(51) Int. Cl.
*H04L 41/22* (2022.01)
*H04L 43/026* (2022.01)

(52) U.S. Cl.
CPC ............ *H04L 41/22* (2013.01); *H04L 43/026* (2013.01)

(58) Field of Classification Search
None
See application file for complete search history.

(56) References Cited

U.S. PATENT DOCUMENTS

| | | | |
|---|---|---|---|
| 6,453,360 B1* | 9/2002 | Muller | H04L 69/167 709/236 |
| 7,103,873 B2* | 9/2006 | Tanner | G06F 8/20 717/109 |
| 9,923,782 B1 | 3/2018 | Bindle et al. | |
| 9,960,956 B1* | 5/2018 | Johnson | H04L 43/20 |
| 11,108,704 B2 | 8/2021 | Blumrich et al. | |
| 2011/0283278 A1 | 11/2011 | Murrell et al. | |
| 2016/0216913 A1* | 7/2016 | Bosshart | H04L 45/74 |
| 2019/0044856 A1 | 2/2019 | Fischetti | |
| 2020/0050633 A1* | 2/2020 | Evans | G06F 16/9024 |
| 2020/0097295 A1* | 3/2020 | Xu | G06F 9/54 |
| 2021/0295181 A1* | 9/2021 | Goyal | G06N 20/00 |

FOREIGN PATENT DOCUMENTS

CN    108199924 B    2/2020

OTHER PUBLICATIONS

"Network Visualization," https://portal.nutanix.com/page/documents/details?targetId=Web-Console-Guide-Prism-v6_0:wc-network-visualization-intro-c.html, pp. 1-12.

(Continued)

*Primary Examiner* — Kevin T Bates
*Assistant Examiner* — Emad Siddiqi
(74) *Attorney, Agent, or Firm* — Kilpatrick Townsend & Stockton LLP

(57) ABSTRACT

A computing device can receive flow data from one or more flow tables for a programmable network switch. The computing device can also generate, based on the flow data, a graphical user interface showing relationships between recirculation operations defined in the flow data. The graphical user interface can include a directed graph having nodes representing the recirculation operations. The graphical user interface can also include directed links specifying a sequential order in which the recirculation operations are to be applied to data packets by the programmable network switch. Each of the nodes can correspond to a respective recirculation operation among the recirculation operations.

20 Claims, 7 Drawing Sheets

(56) References Cited

OTHER PUBLICATIONS

Malishevskiy et al., "OpenFlow-based Network Management with Visualization of Managed Elements," College of Technology, Unv. of Houston, USA; Santa Clara, California, USA, Mar. 2014, pp. 1-3.
"OVS-DPDK End to End Troubleshooting Guide," https://access.redhat.com/documentation/en-us/red_hat_openstack_platform/10/html-single/ovs-dpdk_end_to_end_troubleshooting_guide/index, 2022, pp. 1-121.

* cited by examiner

| | match | | | actions | |
|---|---|---|---|---|---|
| recirc_id: 0 | input: eth0 | ... | ... | recirc: 1 | |
| recirc_id: 1 | ... | | ... | drop | |
| recirc_id: 2 | ... | | ... | output: eth0 | |
| recirc_id: 1 | ... | | ... | recirc: 2 | |
| recirc_id: 3 | ... | | ... | controller | |
| recirc_id: 0 | input: eth1 | ... | ... | recirc: 3 | |
| recirc_id: 1 | ... | | ... | recirc: 4 | |
| recirc_id: 4 | ... | | ... | output: eth1 | |
| recirc_id: 5 | ... | | ... | output: eth3 | |
| recirc_id: 3 | ... | | ... | recirc: 2 | |
| recirc_id: 0 | input: eth0 | ... | ... | recirc: 5 | |

FIG. 4

INTERACTIVE GRAPHICAL USER INTERFACE FOR VISUALIZING FLOW DATA IN A PROGRAMMABLE NETWORK SWITCH

TECHNICAL FIELD

The present disclosure relates generally to managing a network switch. More specifically, but not by way of limitation, this disclosure relates to visualizing flow data associated with a programmable network switch through an interactive graphical user interface.

BACKGROUND

A network switch can forward data between devices on a computer network by using packet switching. For example, a network switch can receive data packets from a source device and forward data packets to a target device. Network switches can be implemented using hardware, software, or both. One type of network switch implemented in software is a virtual network switch. A virtual network switch is a software application that is designed to emulate the functionality of a hardware network switch. Some network switches can be programmable. With a programmable network switch, the packet flow is dictated by one or more configurable flow tables assigned to (e.g., stored in) the network switch. This programmability can allow for flow control that is dynamically adjustable by a user, such as a network administrator.

The network switch can implement packet flows based on the one or more flow tables. Each such flow can include one or more actions that can be performed on data packets that satisfy one or more match criteria. Examples of the actions can include modifying metadata of the data packets, sending the data packets through specific ports, or sending the data packets to a daemon for additional processing. The match criteria can include values that can be compared with a portion of the metadata or payload of each data packet being processed. In some cases, a network switch can implement a particular flow path, containing certain actions, if a portion of the data packet matches a certain value. Each flow in the network switch can be stored as a row of flow data in the one or more flow tables.

In some cases, the network switch can reevaluate a data packet multiple times using multiple different flows in the one or more flow tables in a process known as recirculation. For example, the network switch can initially evaluate a data packet using a first flow in a flow table based on the data packet matching a first criterion. As a result of the first flow, the network switch may modify data packet's metadata. After modifying the metadata, the network switch can evaluate the data packet again using a second flow in a flow table (e.g., the same flow table or a different flow table) based on the modified metadata matching a second criterion. This recirculation process can lead to the same network switch evaluating the same data packet multiple times against the same set of flows in the one or more flow tables.

BRIEF DESCRIPTION OF THE DRAWINGS

FIG. 4 is an example of a flow table containing flow data according to some aspects of the present disclosure.

DETAILED DESCRIPTION

Figure 1:
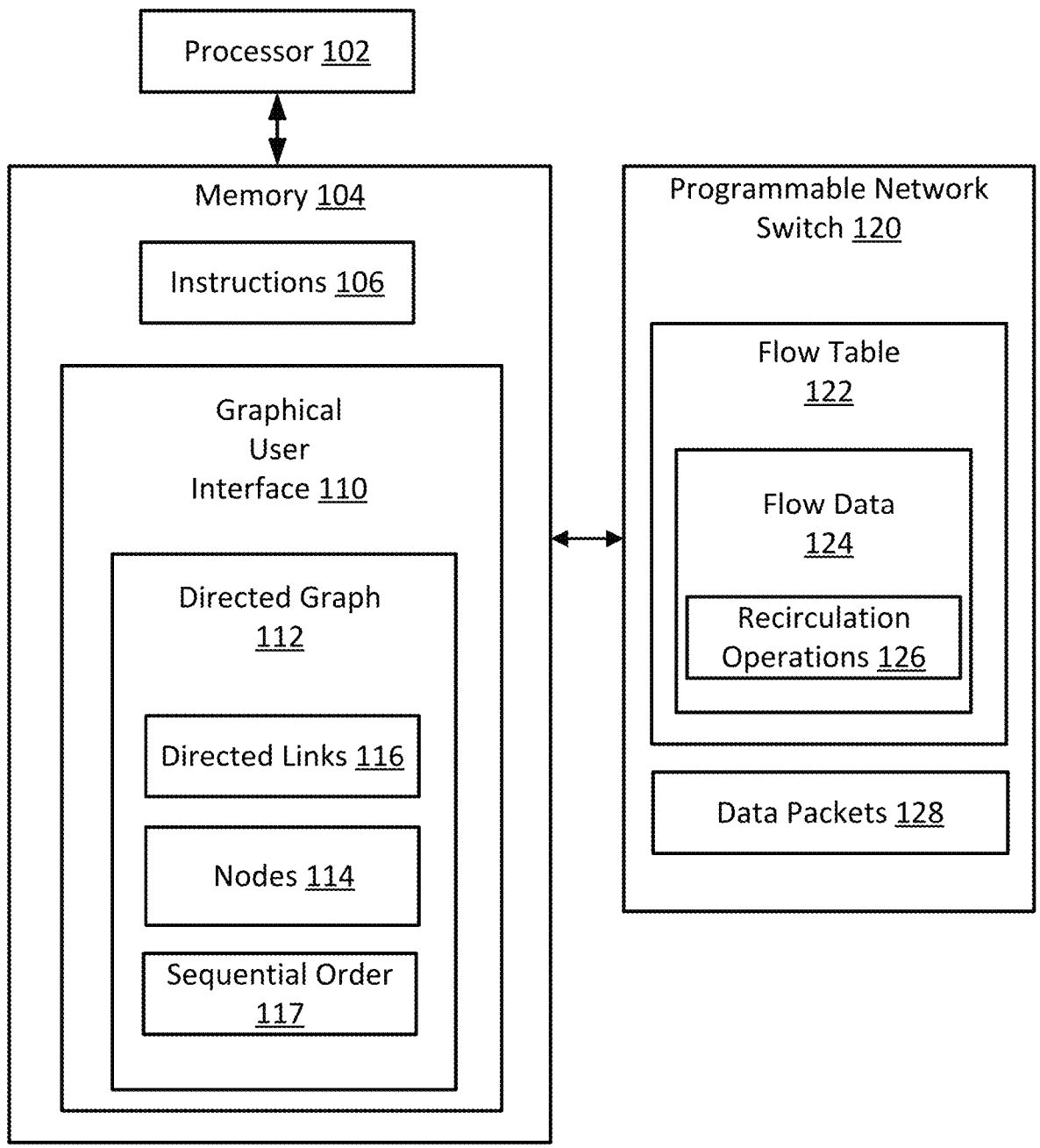
FIG. 1 is a block diagram of an example of a system for visualizing flow data associated with a programmable network switch according to some aspects of the present disclosure.

Often, it can be desirable to understand how data packets flow through a network switch, for example to troubleshoot a problematic flow. But, the flow data can include large quantities of disorganized match criterion and actions that can complicate a debugging process. For example, a single flow table can include hundreds of disorganized rows of flow data, each of which can include multiple sets of match criteria and actions, making the information challenging to manually decipher and follow. Further, a single data packet can be sent through multiple packet flows on the same network switch because of recirculation operations, before ultimately being transmitting from the network switch to a destination device. Such recirculation operations can make it even more challenging for a network administrator to manually analyze the flow table to understand the flow of data packets through the network switch. These complications can make it difficult to debug flow problems that can arise.

Some examples of the present disclosure can overcome one or more of the abovementioned problems by generating a graphical user interface for visualizing relationships between recirculation operations defined in flow data. The graphical user interface can be generated from flow data retrieved from one or more flow tables associated with the programmable network switch. The graphical user interface can include a directed graph with nodes. Each node can represent a recirculation operation that recirculates data packets. The graphical user interface can include directed links for depicting a sequential order in which the recirculation operations are applied to the data packets by the programmable network switch. For example, a first recirculation operation can be connected visually to a second recirculation operation by a directed link from the first recirculation operation to the second recirculation operation, where the first recirculation operation takes place prior to the second recirculation operation. Through this graphical user interface, a network administrator can be better able to understand how data packets flow (e.g., are recirculated) through the network switch.

In some examples, each node of the graphical user interface can specify an action to be applied to a data packet during its corresponding recirculation operation. For example, the action can include sending the data packet through a port or modifying its metadata. Each node can also specify a match criterion that must be satisfied by the data packet for the action to be performed. Each node can further specify a recirculation identifier that can indicate the respective recirculation operation corresponding to the node. For example, the recirculation identifier of the node can include a unique value (e.g., numerical value) corresponding to the recirculation operation. Multiple rows of flow data in the one or more flow tables can correspond to the same recirculation identifier but have differing match criteria and actions.

To generate the graphical user interface, a system can analyze the rows of flow data and group them together by their recirculation identifiers into recirculation groups. Each recirculation group can correspond to a respective recirculation identifier such that the flows in each recirculation group correspond to the same recirculation operation. Within each recirculation group, the system can further classify the rows of flow data into one or more subgroups. This system can perform this classification based on one or more parameter values (e.g., match criteria or actions) associated with the rows of data. Each subgroup can correspond to a respective parameter value. For example, a subgroup can be an input port group, where the rows of data classified into that subgroup have the same input port. The system can then generate the directed graph of the graphical user interface based on the recirculation groups and subgroups.

The directed graph can include a series of flow sequences. Each flow sequence can depict a series of recirculation operations that are visually connected with directed links. Each flow sequence can begin at an input port and end at an output port or an ending action. For example, an ending action can include a drop action that can be used for dropping a certain packet, which can prevent the packet from progressing to a destination address (e.g., IP address).

In some examples, a user can provide a filter criterion as user input to exclude flow sequences that do not satisfy the filter criterion from being displayed on the graphical user interface. For example, the filter criterion can require a flow sequence to end at a user-specified output port or a user-specified ending action to enable the flow sequence to be displayed on the directed graph. In some examples, the user can apply conditional logic operators to a set of multiple filter criteria to further specify which flow sequences are to be displayed on the directed graph.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for visualizing flow data associated with a programmable network switch according to some aspects of the present disclosure. The system can include a processor 102 and a memory 104. The processor 102 and memory 104 can be integrated into a single housing or can be distributed from one another.

The processor 102 can include one processor or multiple processors. Non-limiting examples of the processor 102 include a Field-Programmable Gate Array (FPGA), an application-specific integrated circuit (ASIC), a microprocessor, etc. The processor 102 can execute instructions 106 stored in the memory 104 to perform one or more operations. In some examples, the instructions 106 can include processor-specific instructions generated by a compiler or an interpreter from code written in any suitable computer-programming language, such as C, C++, C#, etc.

The memory 104 can include one memory device or multiple memory devices. The memory 104 can be volatile or non-volatile, in that the memory 104 can retain stored information when powered off. Non-limiting examples of the memory 104 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 102 with the instructions 106 or other program code. Non-limiting examples of a non-transitory computer-readable medium include magnetic disks, memory chips, ROM, random-access memory (RAM), an ASIC, a configured processor, optical storage, or any other medium from which a computer processor can read the instructions 106.

The processor 102 can be coupled to a programmable network switch 120 configured to perform actions on data packets 128. Examples of the actions can include modifying metadata of the data packets 128, sending the data packets 128 through specific ports, or sending the data packets 128 to a daemon for additional processing. The actions can be described in flow data 124, which the processor 102 can receive from the programmable network switch 120. For example, the processor 102 can retrieve the flow data 124 from one or more flow tables, such as flow table 122, of the programmable network switch 120. Alternatively, the processor 102 can receive the flow data 124 from another source, such as a repository containing flow tables for multiple network switches. The flow data 124 can describe various different types of actions, some of which can include recirculation operations 126 that can be performed on the data packets 128.

After receiving the flow data 124, the processor 102 can generate a graphical user interface 110 based on the flow data 124. The graphical user interface 110 can include a directed graph 112 that includes directed links 116 between nodes 114. The directed links 116 can specify a sequential order 117 among the nodes 114. Each of the nodes 114 can specify an action to be applied to data packets 128 during their corresponding recirculation operations 126. For example, the action can include sending data packets 128 through a port or modifying their metadata. The nodes 114 can also specify a match criterion that must be satisfied by the data packets 128 to trigger performance of the corresponding action.

Figure 2:
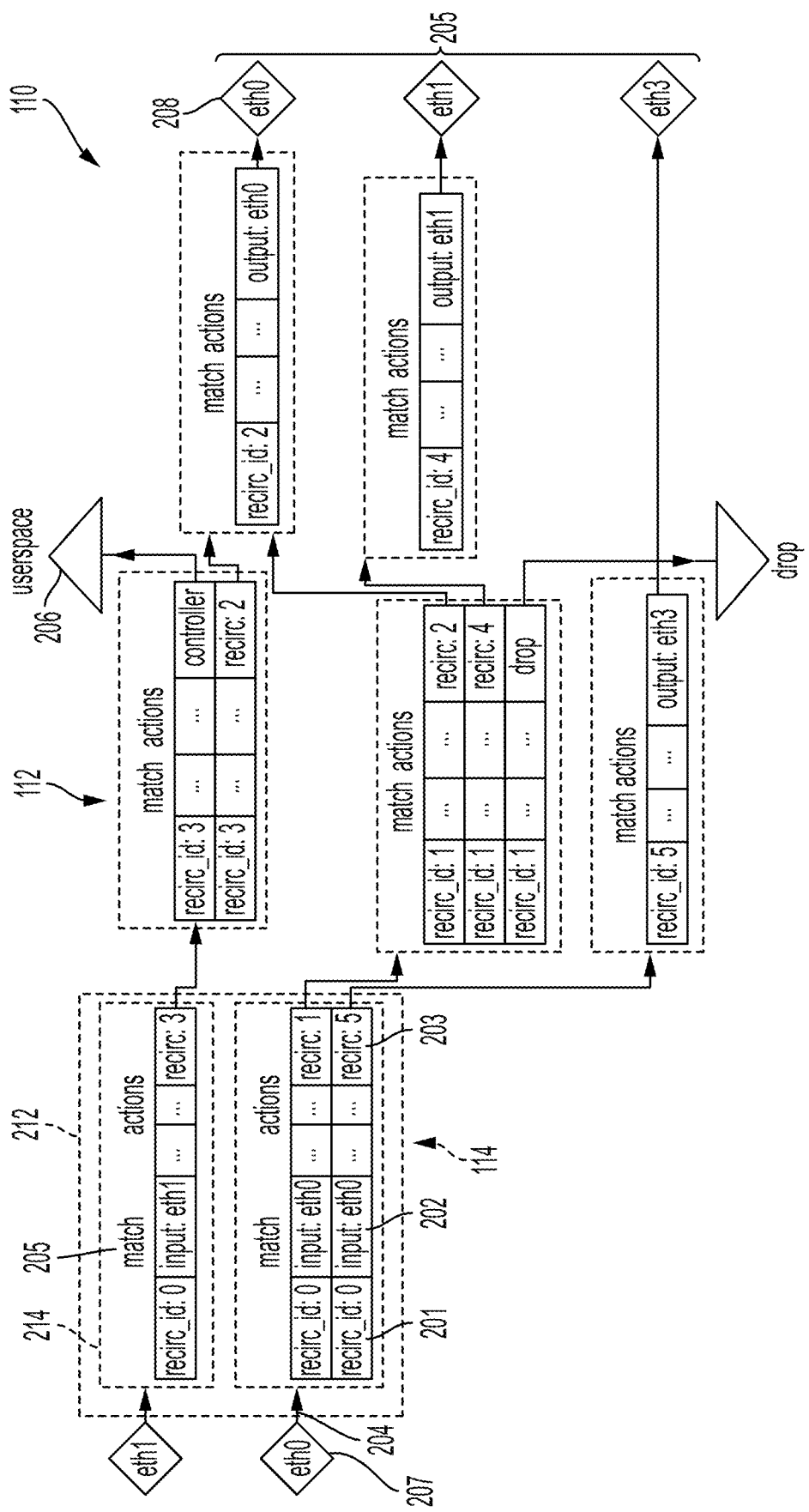
FIG. 2 is an example of a graphical user interface for visualizing flow data associated with a programmable network switch according to some aspects of the present disclosure.

FIG. 2 is an example of a graphical user interface 110 for visualizing flow data associated with a programmable network switch according to some aspects of the present disclosure. The graphical user interface 110 includes a directed graph 112 of nodes 114 that are connected by directed links 116. The nodes 114 are represented in FIG. 2 by the outer dashed boxes. The nodes 114 can be arranged in flow sequences 211 that are depicted parallel to one another in the directed graph 112. Each flow sequence 211 can begin at an input port 207 and end at an output port 208 or an ending action 206. The graphical user interface 110 can represent the output port 208 as a shape with inscribed text. Examples of the shape can include a diamond, box, rectangle, or any other suitable shape. The shape can include a string of text corresponding to a name of the output port 208. In the example shown in FIG. 2, the output port 208 "eth0" is depicted as a diamond with text "eth0" displayed in the center of the diamond. The graphical user interface 110 can also represent the ending actions 206 as shapes without inscribed text that can be different from the shapes with inscribed text. In the example shown in FIG. 2, the ending action 206 corresponding to "userspace" is depicted at the end of a flow sequence 211 as a triangle with text "userspace" adjacent to the triangle. In the example shown in FIG. 2, three flow sequences 211 are depicted in parallel to one another.

Each node 114 can represent a particular recirculation operation. The rows of flow data 124 that have the same recirculation identifier 201 can be grouped into the same node 114. The rows of flow data assigned to a given node 114 can be visually output inside that particular node 114, or information derived from the rows of flow data can be output inside that particular node 114. For example, each node 114 can specify match criteria 205, actions 203, or both derived from the rows of flow data assigned to that node.

As noted above, rows of flow data can be grouped into the nodes 114 by their respective recirculation identifiers 201. The rows of flow data assigned to each node 114 can be further classified into subgroups, which can be referred to as parameter groups 214, based on their parameter values. Each parameter group 214 associated with a given node 114 can correspond to a respective parameter value 202 that is different from the other parameter groups 214 associated with the node 114. For example, a parameter group can be an input port group, where the respective parameter value 202 is an input port value.

Figure 3:
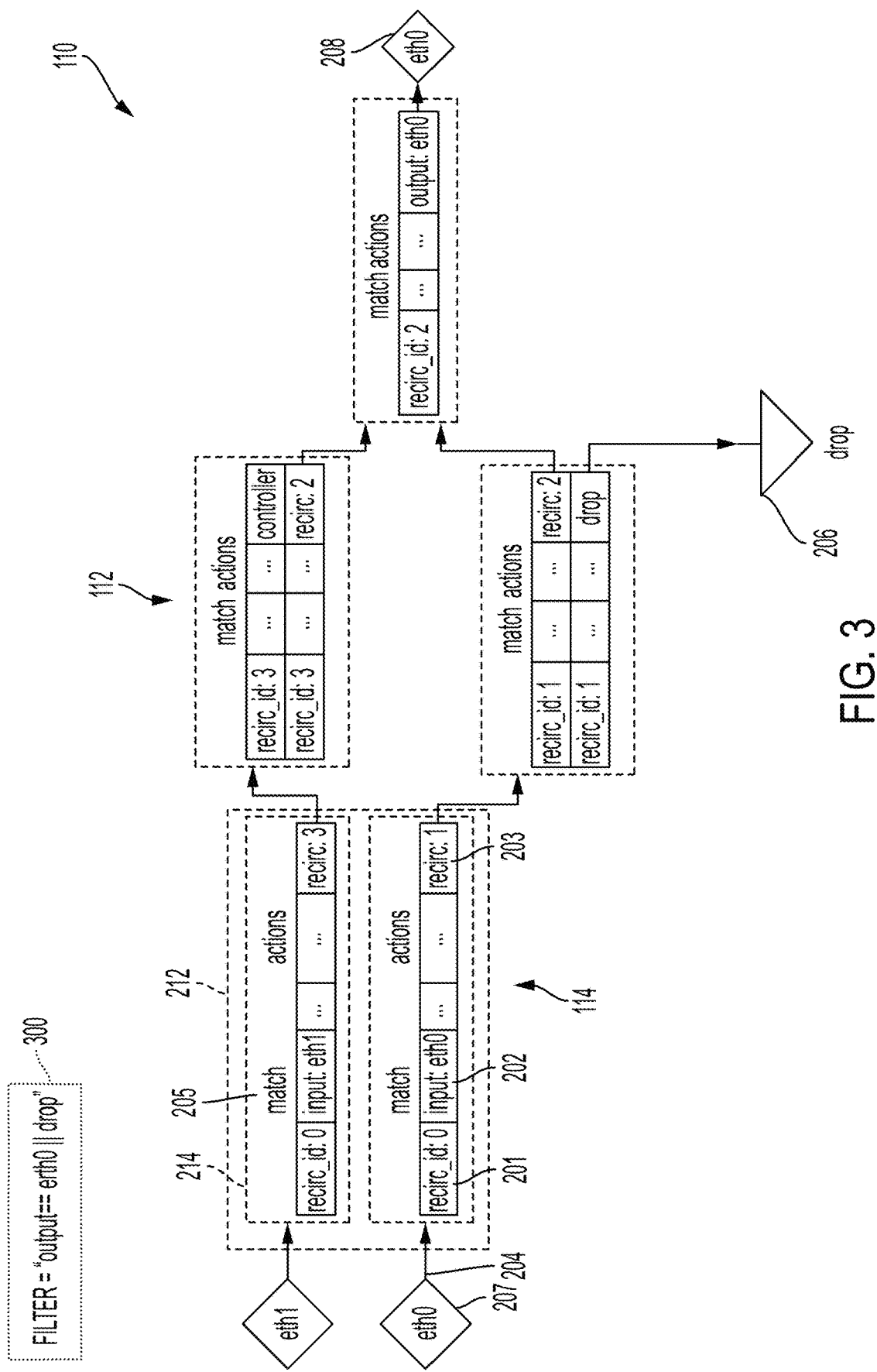
FIG. 3 is an example of a graphical user interface with a filter criterion for visualizing selected flow data associated with a programmable network switch according to some aspects of the present disclosure.

In some examples, a user may wish to limit the number of flow sequences 211 that are concurrently shown in the graphical user interface 110. To do so, the user can input a filter criterion 300, such as the filter criterion 300 depicted in FIG. 3. The filter criterion 300 can enable the user to view flow sequences 211 that satisfy the filter criterion 300. Flow sequences 211 that do not satisfy the filter criterion 300 can be excluded from the directed graph. Examples of filter criteria 300 can include parameter values 202, such as input port values. For example, the filter criterion 300 can cause the graphical user interface 110 to display only flow sequences 211 that begin at a specific input port 207. Alternatively, the filter criterion 300 can cause the graphical user interface 110 to display only flow sequences 211 that end at a specific output port 208 or ending action 206. In some examples, the user can specify the filter criteria 300 to include any combination of input port 207 values, match criteria 205, output port 208 values, or ending action 206 values. The user can implement conditional logic operators to further specify the filter criteria 300. In the example depicted in FIG. 3, the user has input the command "FILTER =="output == eth0 || drop", which can be displayed in a box around the filter criteria 300 on the graphical user interface 110. In accordance with the filter criteria 300, the directed graph 112 includes subgraphs corresponding to flow sequences 211 that end in the "drop" action 203 or are output to the port "eth0". Through this interactivity, the user can dynamically customize which information is output in the graphical user interface, for example to reduce visual clutter in the graphical user interface 110 or assist in troubleshooting tasks.

As noted above, the processor 102 can generate the graphical user interface 110 based on flow data 124 from one or more flow tables, such as flow table 122. One example of such a flow table 122 is shown in FIG. 4. The flow table can include rows of flow data. Each row of flow data can specify an action 203 to be performed on data packets 128 that satisfy the corresponding match criterion 205. Data packets 128 that satisfy the match criterion 205 can have the corresponding action applied. Data packets 128 that do not satisfy the match criterion 205 may not have the corresponding action applied. The match criterion 205 can include a recirculation identifier 201. The recirculation identifier 201 can identify a flow associated with a respective recirculation operation.

When a given recirculation operation associated with a particular recirculation identifier 201 is applied to a data packet, some or all of the rows of flow data associated with that recirculation identifier 201 can be applied to the data packet depending on whether the data packet satisfies the match criteria 205 in those rows.

Figure 5:
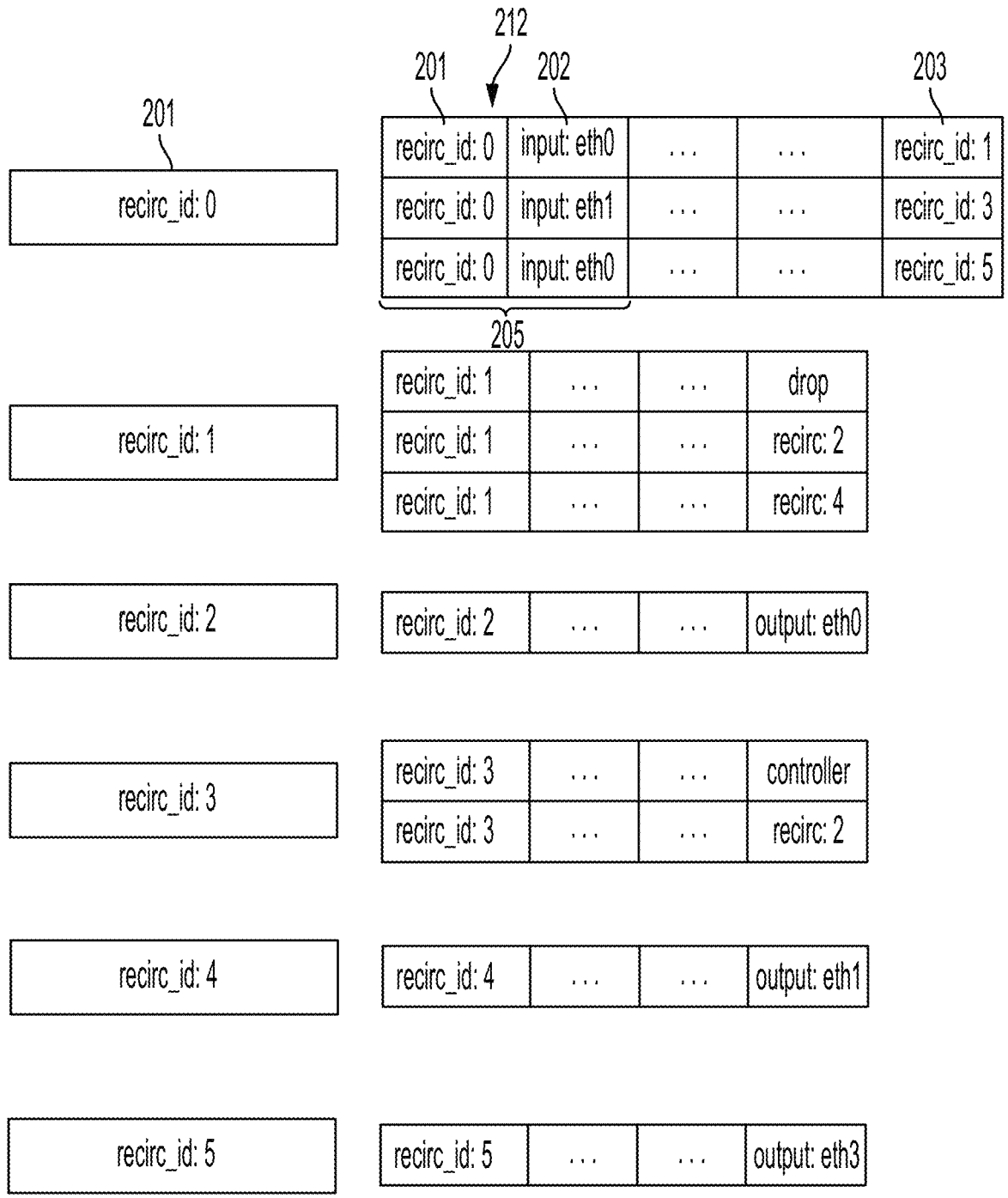
FIG. 5 is an example of rows of flow data that have been grouped by recirculation identifier according to some aspects of the present disclosure.

Once the processor 102 receives the flow data 124, the processor can divide the rows of flow data into recirculation groups 212. An example of this division is shown in FIG. 5. Rows of flow data in each recirculation group 212 can have the same recirculation identifier 201. In the example shown in FIG. 5, the recirculation group 212 associated with recirculation id "0" has three corresponding entries (e.g., rows of flow data). The recirculation group 212 associated with recirculation id "1" also has three corresponding entries. The recirculation group 212 associated with recirculation id "2", "4" and "5" each have one corresponding entries. And the recirculation group 212 associated with recirculation id "3" has two corresponding entries.

Figure 6:
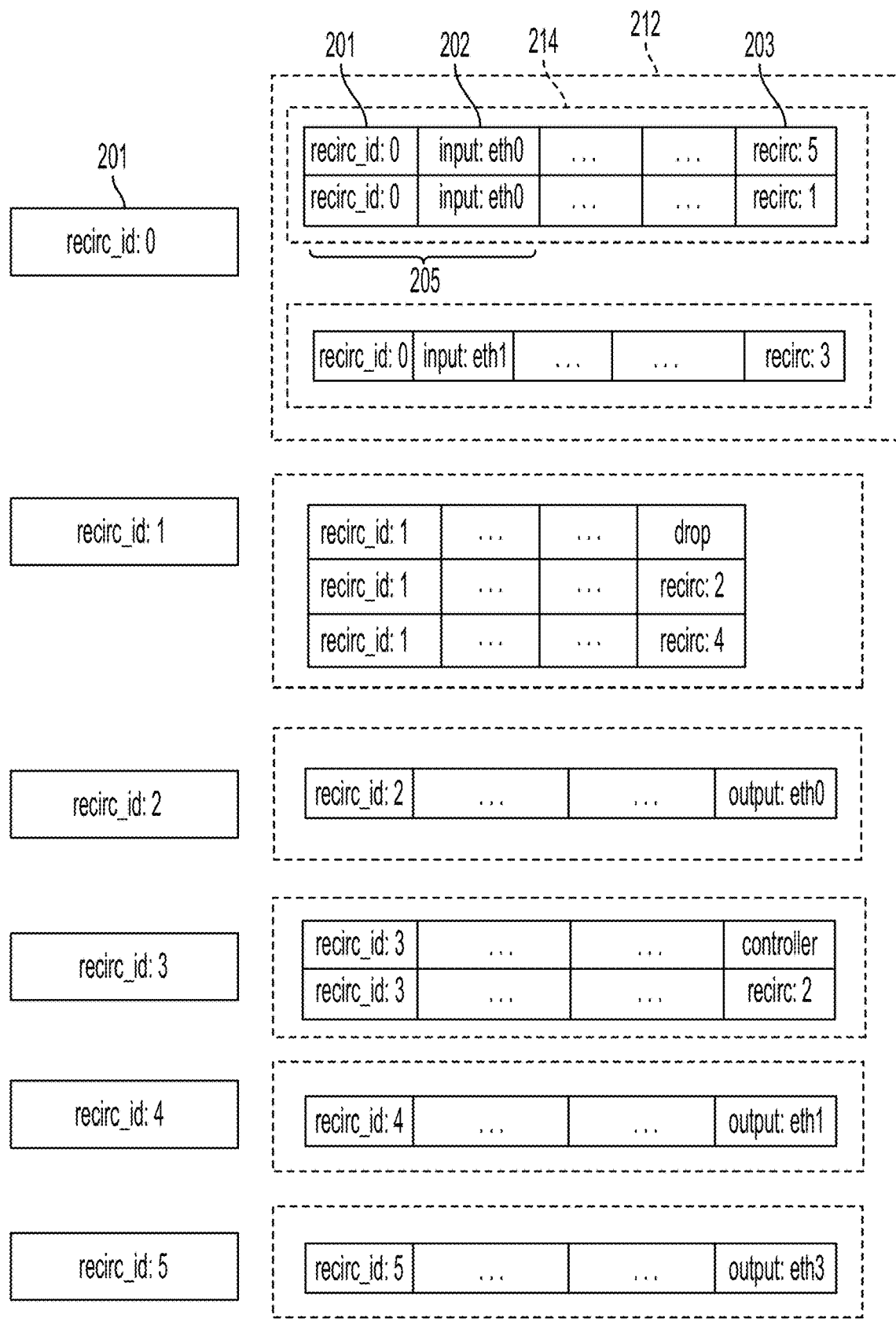
FIG. 6 is an example of rows of flow data grouped by recirculation identifier and input port according to some aspects of the present disclosure.

Next, the processor 102 can further divide each recirculation group 212 into parameter groups 214. An example of this division is shown in FIG. 6. Each row of flow data in each parameter group 214 can share the same parameter value 202. For example, the parameter value 202 can be an input port value. In the example shown in FIG. 6, the recirculation group 212 corresponding to recirculation id "0" has two corresponding parameter groups 214. The parameter group 214 associated with input port value "eth0" has two corresponding entries (e.g., rows of flow data). The parameter group 214 associated with input port value "eth1" has one corresponding entry. Each row of flow data can include a field that can specify an action 203 to can be performed on data packets 128 that satisfy the corresponding match criterion 205.

The graphical user interface 110 can use the parameter groups 214 to generate subgraphs in the directed graph 112. For example, the graphical user interface 110 can define a node 114 that includes rows in the recirculation group corresponding to recirculation id "0". The graphical user interface can generate a subgraph that can display rows within the recirculation group 212 of recirculation id "0" that correspond to the input port value "eth0". The graphical user interface 110 can also generate a parallel subgraph that can display rows within the recirculation group corresponding to recirculation id "0" that correspond to the input port value "eth1." Each subgraph can correspond to a flow sequence 211 that begins at an input port 207 and ends at an output port 208 or ending action 206.

Figure 7:
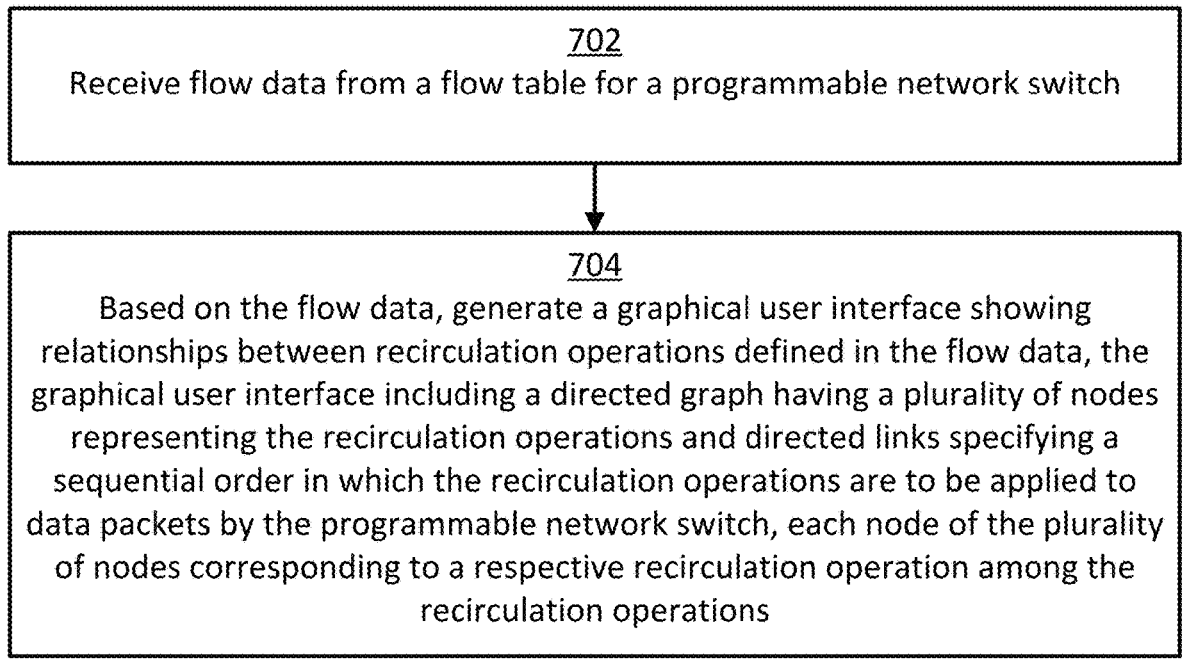
FIG. 7 is a flow chart of a process for generating a graphical user interface for visualizing flow data associated with a programmable network switch according to some aspects of the present disclosure.

FIG. 7 is a flow chart of a process for generating a graphical user interface for visualizing flow data associated with a programmable network switch according to some aspects of the present disclosure. While FIG. 7 depicts a certain sequence of steps for illustrative purposes, other examples can involve more steps, fewer steps, different steps, or a different order of the steps than is depicted in FIG. 7. The steps of FIG. 7 are described below with reference to components of FIG. 1.

At block 702, the processor 102 receives flow data 124 from one or more flow tables (e.g., flow table 122) for a programmable network switch 120. The flow data 124 can include a series of flow sequences 211 that include actions performed on data packets 128 that match flow criteria.

At block 704, the processor 102 can, based on the flow data 124, generate a graphical user interface 110. The graphical user interface 110 can depict relationships between recirculation operations 126 defined in the flow data 124. The graphical user interface 110 can include a directed graph 112 that has a plurality of nodes 114 representing the recirculation operations 126. The directed graph 112 can also include directed links 116 among the nodes 114. The directed graph 112 can specify a sequential order 117 in which the recirculation operations 126 are to be applied to data packets 128 by the programmable network switch 120. Each node of the plurality of nodes 114 can correspond to a respective recirculation operation 126 among the recirculation operations 126.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to:
    receive flow data from one or more flow tables for a programmable network switch; and
    based on the flow data, generate a graphical user interface showing relationships between recirculation operations defined in the flow data, the graphical user interface including a directed graph having a plurality of nodes representing the recirculation operations to be performed by the programmable network switch, each node of the plurality of nodes corresponding to a respective recirculation operation among the recirculation operations to be performed by the programmable network switch, wherein the recirculation operations involve reevaluating data packets on the programmable network switch, and wherein the directed graph also includes directed links between the plurality of nodes to specify a sequential order in which the recirculation operations are to be applied to the data packets by the programmable network switch.

2. The non-transitory computer-readable medium of claim 1, wherein each node of the plurality of nodes specifies one or more actions to be applied to a data packet during the respective recirculation operation corresponding to the node.

3. The non-transitory computer-readable medium of claim 1, wherein each node of the plurality of nodes specifies at least one match criterion and at least one corresponding action that is to be applied by the programmable network switch to a data packet matching the at least one match criterion.

4. The non-transitory computer-readable medium of claim 1, wherein each node of the plurality of nodes specifies a recirculation identifier assigned to the respective recirculation operation corresponding to the node.

5. The non-transitory computer-readable medium of claim 1, wherein the directed graph includes a plurality of flow sequences involving the recirculation operations, the plurality of flow sequences being depicted in parallel to one another in the directed graph, each flow sequence in the plurality of flow sequences being depicted in the directed graph as an independent sequence of recirculation operations starting at an input port and ending at an output port or an ending action.

6. The non-transitory computer-readable medium of claim 5, further comprising program code that is executable by the processor for causing the processor to:
    receive user input indicating a filter criterion to be applied to the directed graph; and
    in response to receiving the user input:
        determine at least one flow sequence in the plurality of flow sequences that does not satisfy the filter criterion; and
        update the directed graph to exclude the at least one flow sequence therefrom.

7. The non-transitory computer-readable medium of claim 1, further comprising program code that is executable by the processor for causing the processor to:
    receive the flow data for the programmable network switch, the flow data including rows of data from the one or more flow tables, each of the rows of data including a respective recirculation identifier, a respective match criterion, and a respective action to be applied to a data packet matching the respective match criterion;
    classify the rows of data into recirculation groups based on the respective recirculation identifier in each row of data, wherein each of the recirculation groups corresponds to an individual recirculation identifier for implementing a single recirculation operation; and
    generate the directed graph based on the recirculation groups.

8. The non-transitory computer-readable medium of claim 7, further comprising program code that is executable by the processor for causing the processor to, subsequent to classifying the rows of data into the recirculation groups:
    for each respective recirculation group among the recirculation groups:
        identify one or more rows, from among the rows of data, assigned to the respective recirculation group; and
        classify the one or more rows into one or more parameter groups based on a respective parameter value associated with each respective row of the one or more rows; and
    generate the directed graph based on the one or more parameter groups associated with each respective recirculation group among the recirculation groups.

9. The non-transitory computer-readable medium of claim 8, wherein the parameter groups are input port groups and the respective parameter value is an input port value.

10. The non-transitory computer-readable medium of claim 1, wherein the programmable network switch is a virtual network switch.

11. A method comprising:
    receiving, by a processor, flow data from one or more flow tables for a programmable network switch; and
    generating, by the processor and based on the flow data, a graphical user interface showing relationships between recirculation operations defined in the flow data, the graphical user interface including a directed graph having a plurality of nodes representing the recirculation operations to be performed by the programmable network switch, each node of the plurality of nodes corresponding to a respective recirculation operation among the recirculation operations to be performed by the programmable network switch, wherein the recirculation operations involve reevaluating data packets on the programmable network switch, and wherein the directed graph also includes directed links between the plurality of nodes to specify a sequential order in which the recirculation operations are to be applied to the data packets by the programmable network switch.

12. The method of claim 11, wherein each node of the plurality of nodes specifies one or more actions to be applied to a data packet during the respective recirculation operation corresponding to the node.

13. The method of claim 11, wherein each node of the plurality of nodes specifies match criteria and at least one corresponding action that is to be applied by the programmable network switch to a data packet matching the match criteria.

14. The method of claim 11, wherein each node of the plurality of nodes specifies a recirculation identifier assigned to the respective recirculation operation corresponding to the node.

15. The method of claim 11, wherein the directed graph includes a plurality of flow sequences involving the recirculation operations, the plurality of flow sequences being depicted in parallel to one another in the directed graph, each flow sequence in the plurality of flow sequences being depicted in the directed graph as an independent sequence of recirculation operations starting at an input port and ending at an output port or an ending action.

16. The method of claim 15, further comprising:
receiving, by the processor, user input indicating a filter criterion to be applied to the directed graph; and
in response to receiving the user input:
determining, by the processor, at least one flow sequence in the plurality of flow sequences that does not satisfy the filter criterion; and
updating, by the processor, the directed graph to exclude the at least one flow sequence therefrom.

17. The method of claim 11, further comprising:
receiving, by the processor, the flow data for the programmable network switch, the flow data including rows of data from the one or more flow tables, each of the rows of data including a respective recirculation identifier, a respective match criterion, and a respective action to be applied to a data packet matching the respective match criterion;
classifying, by the processor, the rows of data into recirculation groups based on the respective recirculation identifier in each row of data, wherein each of the recirculation groups corresponds to an individual recirculation identifier for implementing a single recirculation operation; and
generating, by the processor, the directed graph based on the recirculation groups.

18. The method of claim 17, further comprising:
subsequent to classifying the rows of data into the recirculation groups and for each respective recirculation group among the recirculation groups:
identifying, by the processor, one or more rows, from among the rows of data, assigned to the respective recirculation group; and
classifying, by the processor, the one or more rows into one or more parameter groups based on a respective parameter value associated with each respective row of the one or more rows; and
generating, by the processor, the directed graph based on the one or more parameter groups associated with each respective recirculation group among the recirculation groups.

19. The method of claim 18, wherein the parameter groups are input port groups and the respective parameter value is an input port value.

20. A system comprising:
a processor; and
a memory including instructions executable by the processor for causing the processor to:
receive flow data from one or more flow tables for a programmable network switch; and
based on the flow data, generate a graphical user interface showing relationships between recirculation operations defined in the flow data, the graphical user interface including a directed graph having a plurality of nodes representing the recirculation operations to be performed by the programmable network switch, each node of the plurality of nodes corresponding to a respective recirculation operation among the recirculation operations to be performed by the programmable network switch, wherein the recirculation operations involve reevaluating data packets on the programmable network switch, and wherein the directed graph also includes directed links between the plurality of nodes to specify a sequential order in which the recirculation operations are to be applied to the data packets by the programmable network switch.

* * * * *